United States Patent
Kunbargi

(10) Patent No.: US 7,150,786 B2
(45) Date of Patent: *Dec. 19, 2006

(54) VERY EARLY SETTING ULTRA-HIGH STRENGTH CEMENT

(75) Inventor: Hassan Kunbargi, Huntington Beach, CA (US)

(73) Assignee: Ultimax Corporation, Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/886,013

(22) Filed: Jul. 6, 2004

(65) Prior Publication Data

US 2005/0126443 A1 Jun. 16, 2005

Related U.S. Application Data

(63) Continuation of application No. 09/907,867, filed on Jul. 18, 2001, now Pat. No. 6,758,896, which is a continuation-in-part of application No. 09/716,577, filed on Nov. 20, 2000, now Pat. No. 6,406,534, which is a continuation-in-part of application No. 09/654,288, filed on Sep. 1, 2000, now abandoned, which is a continuation of application No. 09/301,370, filed on Apr. 16, 1999, now Pat. No. 6,113,684.

(51) Int. Cl.
*C04B 7/32* (2006.01)

(52) U.S. Cl. ............... 106/692; 106/692; 106/693; 106/694; 106/695; 106/722

(58) Field of Classification Search ........... 106/692, 106/693, 694, 695, 722
See application file for complete search history.

(56) References Cited

U.S. PATENT DOCUMENTS

| | | | | |
|---|---|---|---|---|
| 4,957,556 A | * | 9/1990 | Kunbargi | 106/693 |
| 6,113,684 A | * | 9/2000 | Kunbargi | 106/692 |
| 6,406,534 B1 | * | 6/2002 | Kunbargi | 106/692 |
| 6,695,910 B1 | * | 2/2004 | Classen et al. | 106/739 |
| 6,730,162 B1 | * | 5/2004 | Li et al. | 106/772 |
| 6,758,896 B1 | * | 7/2004 | Kunbargi | 106/692 |

OTHER PUBLICATIONS

S. Gimenez-Molina and M.T. Blanco-Varela, "Solid State Phases Relationship In The $CaO$-$SiO_2$-$Al_2O_3$-$CaF_2$-$CaSO_4$ System," Cement and Concrete Research, vol. 25 No. 4, pp. 870-882, 1995, Copyright © 1995 Elsevier Science Ltd.

Cesare Gilioli, Franco Massazza and Mario Pezzuoli, "A New Compound Containing Five Components: $17.2CaO.0.8K_2O.6SiO_2.3SO_3.CaF_2$," Cement and Concrete Research, vol. 9, pp. 695-699, 1979, Copyright © 1979 Pergamon Press, Ltd.

Y. Pliego-Cuervo and F.P. Glasser, "Phase Relations and Crystal Chemistry of Apatite and Silicocarnotite Solid Solutions," Cement and Concrete Research, vol. 8, pp. 519-524, 1978, Pergamon Press, Inc.

* cited by examiner

Primary Examiner—Paul Marcantoni
(74) Attorney, Agent, or Firm—Foley & Lardner LLP

(57) ABSTRACT

Clinkered materials containing high concentrations of $\{(C,K,N,M)_4(A,F,Mn,P,T,S)_3(cl,\bar{S})\}$ (crystal X), and $\{(C_2S)_3(C\bar{S})_x Ca(f,cl)_2\}$ or $\{(C_2S)_3(C\bar{S})_3 Ca(f,cl)_2\}$ (crystal Y), and/or $\{C_5S_2\bar{S}\}$ (crystal Z) directly from the kiln, rapidly hardening ultra-high early strength cement including these clinkered materials, methods for forming and using said compositions and the cements so produced are claimed. The methods include the steps of forming a mixture of raw material containing CaO, MgO, $Al_2O_3$, $Fe_2O_3$, $TiO_2$, $Mn_2O_3$, $SiO_2$, $SO_3$, $Na_2O$, $K_2O$, $P_2O_5$ and F, respectively designated C, M, A, F, T, Mn, S, $\bar{S}$, N, K, P and f, and heating said mixture to an elevated temperature between 900° C. and 1,200° C.; before determining average amount of crystals X, Y, and Z. Final mixtures comprising these clinkers and hydraulic or portland type cement are made to produce cement compositions having crystal X concentrations of approximately 5% to 35% by weight, crystal Y concentrations of approximately 5% to 40% by weight, and/or crystal Z concentrations of approximately 5% to 40% by weight, with the remainder being hydraulic or portland type cement. The cements so produced are rapid hardening and exhibit high strengths ranging from 2,000 psi to 7,000 psi in one hour, 6,000 to 8,000 psi in one day and 9,000 to 12,000 psi in 28 days. They are sulfate and sea-water attack resistant and have low heats of hydration, minimal shrinkage, and high water impermeability. The methods claimed also results in significant reduction in gaseous emissions including SOx, NOx and COx.

13 Claims, No Drawings

VERY EARLY SETTING ULTRA-HIGH STRENGTH CEMENT

FIELD OF THE INVENTION

The present invention relates in a broad aspect to rapid hardening high strength cement compositions and methods for their formation including the formation of special clinkered compositions. More particularly, the present invention is directed to rapid hardening, high strength cement compositions and to low emission methods for their formation which beneficially utilize the formation of special crystals in the cement clinker to significantly enhance the early compressive strength, sulfate resistance, and water impermeability of the cement.

BACKGROUND OF THE INVENTION

The manufacturing of hydraulic cement dates back to the earliest days of the Roman Empire. Pozzolana, a volcanic ash from one of the world's earliest cement kilns, Mount Vesuvius, was mixed with lime to form a material capable of hardening under water. It was not until the middle of the eighteenth century that natural hydraulic cements were made by burning mixtures of clay and limestone at high kiln temperatures to produce a clinker which was, after grinding, if mixed with water could set and developed useful strength after curing However, due to the inherent variability associated with natural clay and limestone the exact composition of these cements varied widely and performance was unpredictable.

The art became a science in the early nineteenth century when Joseph Aspdin invented a process of carefully proportioning combinations of calcium, silicon, iron and aluminum found in local clay and lime deposits and burning these materials at high temperatures. This patented process resulted in Portland cement with more consistent performance named after the stone quarried on the Isle of Portland off the British coast. Portland type cement is still one of the most commonly used structural materials today. In spite of significant advances in the material sciences, even today the basic process for making cement has remained essentially unchanged. Raw materials mainly including limestone and clay are measured and mixed then fired at temperatures in excess of 1500° C. (2700° F.) until a cement "clinker" is formed. The finished clinker is crushed and ground for use as cement and can be mixed with post production ingredients such as gypsum, soluble and natural $CaSO_4$. For convenience of further description, the following standard cement industry abbreviations will be utilized to describe the composition of fired materials:

H—represents water ($H_2O$)
C—represents Calcium Oxide (CaO)
A—represents Aluminum Oxide ($Al_2O_3$)
F—represents Ferric Oxide ($Fe_2O_3$)
M—represents Magnesium Oxide (MgO)
T—represents Titanium Oxide ($TiO_2$)
S—represents Silicon Oxide ($SiO_2$)
K—represents Potassium Oxide ($K_2O$)
N—represents Sodium Oxide ($Na_2O$)
$\bar{S}$—represents Sulfur Trioxide ($SO_3$)
Mn—represents Manganese Oxide ($Mn_2O_3$)
P—represents Phosphorous Oxide ($P_2O_5$)
f—represents fluorine F
cl—represents Chlorine Cl.

Recent advances in our understanding of cement chemistry, the thermal dynamics of cement kiln operation and control, and pioneering breakthroughs in structural analyses using x-ray diffraction crystallography have allowed material scientists and cement manufactures to overcome and minimize many of the variables and problems inherent in cement manufacturing. However, two particularly vexing problems remain to be fully resolved. First, modern commercial cement compositions rely on a mineral composition known as $C_3S$ silicate and its hydration (water incorporation) rate for early strength. Yet, these compositions inherently contain high concentrations of non-early strength producing $C_2S$ in their base clinkers which cannot be converted to the more desirable $C_3S$. High early strength and rapid setting times relate to the hydration rate of the $C_3S$. General purpose Portland type cement (usually designated ASTM I) typically contains approximately 50% $C_3S$, 25% $C_2S$, 12% $C_3A$, 8% $C_4AF$, 5% C. Thus the total amount of calcium silicates is approximately 75%, with the predominant silicate being $C_3S$. The hydration rate of $C_3S$ and $C_2S$ significantly differ with the $C_2S$ component taking up to one year to fully hydrate. Consequently the $C_2S$ contributes very little or nothing to the early strength of the cement product. This is even further exacerbated if additional $C_2S$ is added to the clinkered material by supplementation with hydraulic cement during final product formulation. Consequently, the net silicate hydration rate, and therefore the ultimate rate of strength formation, is limited by the $C_2S$ hydration rate when the aqueous phase (water) is added.

The second perpetual problem associated with all current cement manufacturing processes is the terrible burden placed on the environment. Cement manufacturing is the single most significant source of atmospheric SOx (sulfur oxides) contamination. Further, other noxious gaseous emissions are exuded by the ton from the reaction conditions within the cement kiln. What is more, great quantities of fossil fuels are burned to power these huge kilns and plumes of silicon and aluminum particulates are generated by the mixing, packaging and shipping of the raw materials and final cementuous products. Many collateral methods have been developed to reduce these pollutants. However, the clinker formation process is still fraught with potentially disastrous environmental consequences.

There are four primary properties of cement and its products that material scientists continually work to improve: high early strengths, rapid setting time, resistance to degradation, and good expansiveness to offset shrinkage. For example, concrete made from portland cement together with sand, gravel or other mineral aggregate, typically undergoes shrinkage upon drying. This shrinkage is undesirable in that, among other reasons, it gives rise to cracks which ultimately weaken the set concrete.

Cracking results from excessive shrinking and high heats of hydration in thickly poured structures (cement and water react chemically and produce heat unlike plaster and water which merely dries). The shrinkage rate can be controlled through increasing the amount of calcium aluminum sulfate in the clinker which expands upon hydration in the presence of free CaO and $CaSO_4$. Early attempts at reducing cracking and thereby increasing overall strength and resistance to chemical attack resulted in the so-called "calcium alumino sulfate" cements based upon $3CaO.3Al_2O_3.CaSO_4$, abbreviated as either $C_3A_3C\bar{S}$ or, preferably $C_4A_3\bar{S}$. Typically, the primary characteristic of $C_4A_3 \bar{S}$ cements is their expansiveness. Addition of additives such as $C_4A_3\bar{S}$ counteracts shrinkage and may or may not produce cements having early high strength. Examples of these calcium alumino cements can be found in U.S. Pat. No. 3,155,526 (Klein), U.S. Pat. No. 3,860,433 (Ost) and U.S. Pat. No. 4,798,628 (Mills).

Resistance to chemical degradation, water permeability and chlorine attack are qualities that result from improved resistance to cracking and chemical neutralization of reactive species by ingredients within the cement matrix. Resistance to sulfate attack is provided by limiting the $C_3A$ content to less than 5%, or using novel means to eliminate $C_3A$ through reactions with $C\bar{S}$.

Excepting the Kunbargi patent discussed below, one consistent element of the prior art has been the use of kiln temperatures in excess of 1500° C. This temperature has been believed necessary by those skilled in the art to encourage the production of the desirable stable calcium silicate $C_3S$. However, these elevated kiln temperatures which have dominated the sintering process since Mount Vesuvius first erupted have not been without detriment. The temperatures traditionally used to reach sintering temperatures within the kiln result in a significant source of the primary greenhouse gases released during the calcining of $CaCO_3$ and through the burning of fossil fuels in the kiln. In addition to $CO_2$, copious amounts of NOx, and SOx also emanate from the kiln as the calcining and sintering processes continue. Furthermore, operating industrial kilns within narrow controlled ranges is extremely difficult due to the lack of precise thermal monitoring equipment that can be used in the high particulate environment of a cement kiln. Consequently, any advance in cement manufacturing material science and chemistry that can improve the final product's desired properties, reduce the number of post production ingredients required, and significantly reduce gaseous emissions would be considered an important advance in cement manufacturing.

Perhaps the most significant advance in Portland type cement design and chemistry is disclosed in the present inventor's U.S. Pat. No. 4,957,556 patent (Kunbargi). This patent discloses and claims cement compounds formed from what was then an entirely new class of clinkered materials which for the first time contained high concentrations of $C_4A_3\bar{S}$. At that time, the present inventor was the first to invent associated methods for enriching clinkers to high concentrations of $C_4A_3\bar{S}$. Broadly stated, this was achieved by adjusting the ratio of reactants in the raw materials and by using x-ray diffraction analysis to carefully control kiln temperature to a narrow and specific range of relatively high temperatures below 1500° C. In addition, cement compounds of the Kunbargi '556 patent exhibited increased resistance to sulfate attack due to the concurrent discovery that soluble $CaSO_4$ anhydrite would react with residual $C_3A$ in the clinker and exogenous $C_3S$ sources.

However, though a dramatic improvement over the prior art, this earlier cement formulation and production technology still requires the tedious and expensive addition of controlled amounts of soluble $CaSO_4$ anhydrite and exogenous $C_3S$ to the finished clinker. The exogenous $C_3S$ present in this hydraulic cement additive also brings with it the undesirable $C_2S$ silicate which has a slower hydration rate than would optimally be desired to produce an extremely fast high strength early setting cement. Consequently, although a significant advance over the prior art, the cement compositions of the '556 patent still utilize post manufacturing supplementation with two active ingredients and have early strength qualities which are limited by the slow hydration rates associated with the $C_2S$ in the hydraulic cement supplement.

In spite of these prior art advances in the production of early setting high strength cement, the development of Portland type cements having even greater compressive strengths and higher rates of strength development than those presently available would be of great economic benefit to the cement and the construction industries. For example, in the production of pre-cast, pre-stressed, concrete products, a compressive strength on the order of 4000–5000 psi at three hours is often required. Additionally, in the construction and repair of highways, bridges and freeway overpasses many days and even weeks of curing time are required before these structures set to sufficient compressive strengths to support their anticipated loads so that they may be utilized as designed. The resultant delays cost millions of dollars annually in increased transportation costs and shipping delays while critical transportation corridors are shut down waiting for concrete to harden. Moreover, in the construction of concrete buildings, where the cement matrix is cast into forms, it is necessary to allow days of curing time to allow the cement to develop sufficient strength for removal of the forms. This delay results in lost revenues for property owners and inconvenience and storage costs for industrial tenants. Furthermore, because setting rates of Portland type cements can be affected by temperature, an early setting, ultra-high strength cement with a lower heat of hydration that would make the production of large complex superstructures possible in extremely low ambient temperature environments would be an even greater contribution to the construction industry.

However, these and other improvements in cement quality should not be made at the expense of the environment. Cement manufacturing is a notoriously environmentally unfriendly process. In the past, the benefits that society has received from cement, mortar and concrete have considerably outweighed the environmental impact. However, a process for making a superior clinkered material than currently known in the art that would significantly reduce gaseous emissions of SOx, NOx and COx would represent a tremendous industrial and environmental advance.

Accordingly, it is a particular object of the present invention to provide a rapid hardening high early strength Portland-type cement composition with an extremely rapid $C_2S$ hydration rate. Whereas the best cements known in the art can produce compressive strengths within one hour on the order of 3000 psi and on the order of 6000 psi within one day, the cement compositions of the present invention will produce compressive strengths on the order of 4000–6000 psi within one hour, on the order of 7000–8000 psi within one day. The resulting cement compounds will also possess a sulfate resistance of 0.01% at one year without requiring the addition of soluble $CaSO_4$ to the finished clinker, a water permeability of less than 1 mm in one year, a drying shrinkage of 0.03% at 28 days, a heat of hydration of 70 cal/g at 28 days.

It is a further additional object of the present invention to provide methods for producing rapid hardening high early strength Portland-type cement compositions, and compositions so produced, which are particularly well suited for use in pouring large structures, even in cold temperatures. This advantageous quality is derived from a generally low overall rate of hydration resulting from the present invention, where, unlike the prior art hydration, is concentrated during the initial plastic phase shortly after hydration. This early rate of hydration generates considerable heat for a relatively short period of time. However, according to the teachings of the present invention, this high initial heat of hydration is dissipated well prior to final setting of the cement thereby reducing thermal cracking in the finished product.

It is a further additional object of the present invention to provide methods for producing rapid hardening high early strength Portland-type cement compositions which achieve early high strength through the advantageous utilization of combined hydrated Ettringite.

It is also an object of the present invention to provide methods for producing clinkered materials using processes that significantly reduce the environmental damage associated with cement manufacturing. These improved methods will result in a reduction in SOx on the order of 98%, a 35% reduction in NOx, and a 50% reduction in COx as compared with conventional clinkered manufacturing methods. Furthermore, the previously unusable waste product, Phosphogypsum, can be consumed by processes of the present invention, further reducing environmental impact.

It is yet another object of the present invention to provide early setting ultra-high early strength cement compositions at reduced costs and with greater manufacturing convenience.

SUMMARY

These and other objects are achieved by the methods and cement compositions of the present invention which utilize low temperature burning of specific mixtures of raw materials to produce, in the kiln, special clinkers having high concentrations of $\{(C,K,N,M)_4(A,F,Mn,P,T,S)_3(cl,\bar{S})\}$ (crystal X), and $\{(C_2S)_3(C\bar{S})_3\ Ca(f,cl)_2\}$ or $C_9S_3\bar{S}_3\ Ca(f,cl)_2$ (crystal Y), and/or $\{C_5S_2\bar{S}\}$ (crystal Z) which clinkers are mixed with hydraulic or portland type cement to produce final cement compositions within the scope and teachings of the present invention. When hydrated, the resulting cement compositions exhibit the desirable physical properties of extremely high strengths, low heats of hydration, low shrinkage, low water permeability, and sulfate resistance characteristics, in unusually short periods of time, and ultimately cure to previously unachievable compressive strengths through the combined action of the aqueous phases of crystals X, Y, and/or Z The table below illustrates the dramatic and surprising increase in compressive strengths available as a result of the present invention versus previously superior compressive strengths produced in accordance with the '556 patent.

| Cement Type | Age | Compressive Strength |
| --- | --- | --- |
| '556 Patent | One hour | 3,000 psi |
|  | One day | 6,000 psi |
|  | Twenty eight days | 10,000 psi |
| Present invention | One hour | 5,000 psi |
|  | One day | 8,000 psi |
|  | Twenty eight days | 12,000 psi |

In accordance with the teachings of the present invention it was surprisingly discovered by the inventor that by carefully controlling kiln temperature and by adjusting the ratio of raw materials within the kiln, that two new and unexpected crystals would form in the kiln and remain stable in the final clinker. These two new, and unexpected crystals, Y and Z, described above, have never before been formed in a cement kiln. In general, it is believed that crystals Y and Z are $C\bar{S}/C_2S$ complexes that when hydrated release a fresh, highly reactive form of $C_2S$ and $C\bar{S}$. This highly reactive form of $C_2S$ is rapidly hydrated and was found by the inventor to significantly accelerate the hydration rate of the $C_2S$ normally found in portland-type hydraulic cement supplements. Consequently, when the clinker of the present invention is supplemented with hydraulic cement the normal $C_2S$ hydrates at rates comparable to $C_3S$. This produces an high strength cement faster than previously available in the art. Additionally, the $C\bar{S}$ liberated from the hydration of crystals Y and Z also is available to react with $C_3A$ typically found in supplemental portland type cements which, in accordance with the teachings of the present invention, significantly increases sulfate resistance in the resulting cement compositions.

Another benefit of the present invention is the significant reduction in gaseous emissions achieved by its new sintering technique. The over 1500° C. prior art temperatures traditionally used to reach sintering temperatures within a cement kiln result in the production of the primary greenhouse gases released during the calcining of $CaCO_3$. Furthermore, such extreme prior art temperatures require consumption of significantly more fossil fuels to feed the kiln which in turn results in additional gaseous emission releases. However, as a result the lower kiln temperatures required by the methods of the present invention with the constant kiln monitoring techniques, a 98% reduction in SOx, a 35% reduction in NOx and a 50% reduction in COx can be achieved. An equally unexpected and valuable environmental benefit of the present invention is that phosphogypsum, a toxic by product of the fertilizer industry, can be substituted successfully for gypsum (the primary source of $C\bar{S}$) in the production of the cement compositions disclosed and claimed. In contrast, phosphogypsum cannot be used in prior art concrete manufacturing processes due to the high P concentration.

Another unanticipated and valuable benefit of the present invention is that the novel cement and clinkered compositions and processes result in reduced manufacturing costs and final product costs. The lower kiln temperatures required to produce these novel clinkers significantly reduce fossil fuel consumption and corresponding fuel costs while increasing nominal kiln output by 35% as compared to the nominal kiln specification and production rate of portland cement. Consequently, the resulting clinkers can be more economically produced than previous clinkers which can result in dramatically lower costs to the consumer. Furthermore, in accordance with the teachings of the present invention the rapid hydration rates associated with crystals Y and Z reduce the quantity of clinker required to produce early setting ultra-high strength cement compounds. Moreover, crystals Y and Z produced in accordance with the teachings of the present invention, contribute all of the $CaSO_4$ required to from the final cementuous compounds of the present invention. Therefore, these factors combine to create superior cement products at lower costs, which, as a result, can be manufactured, used and sold more economically than prior art technology and cement products.

Broadly speaking, the first step of the exemplary methods for producing rapid hardening high strength cement compositions in accordance with the teachings of the present invention involves the formation of a mixture of limestone, gypsum or phosphogypsum and bauxite, kaolinite or other high alumina clay and calcium fluoride or any other raw materials that contain high concentrations of fluoride, such as alkaline fluoride. These provide the necessary reactants of the present invention, S, A, C, F, M, P, f, and $\bar{S}$. These mixtures preferably have an overall molar ratio of $\bar{S}/(A+F)$ between approximately 0.05 and 1.5, an overall molar ratio of S/A between approximately 0.25 and 0.45, an overall molar ratio of $f/\bar{S}$ between approximately 0.06 and 0.1, an overall molar ratio of N/C between approximately 0.05 and 0.1, an overall molar ratio of K/C between approximately 0.08 and 0.15, an overall molar ratio of M/C between approximately 0.03 and 0.05, and an overall molar ratio of P/A between approximately 0.03 and 0.05.

In contrast to the known, prior art, methods of cement production which fire their raw material mixtures at temperatures above 1200° C., and more often above 1500° C., the mixtures produced in accordance with the methods of the present invention are heated to elevated temperatures between 900° C. and 1200° C. for a sufficient period of time to form clinkers having high concentrations of crystals X, Y and/or Z discussed above. It should be emphasized that heating the mixtures of the present invention to temperatures greater than 1200° C. will decompose the desired crystals. Thus, the methods of the present invention produce these crystal phases in the kiln by burning the clinkers at reduced temperatures.

Once the clinkers have been formed, the average ratios of X/Y or X/Z or X/Y+Z are determined and final mixtures are formed by combining the clinkers with hydraulic or portland type cement so that the final mixtures include an X+Y, X+Z, or X+Y+Z content of approximately 15% to 55% by weight. The remaining 45–85% by weight being hydraulic or portland cement.

Because of the narrow kiln temperature range used in the present invention, between 900° C. and 1200° C. at which temperatures X, Y, and Z are stable in the kiln, the methods of the present invention are beneficially practiced using modern, state of the art kiln temperature controls. Those skilled in this art will appreciate that contemporary cement kilns do not have temperature controls at the burning zone of the kiln itself. Accordingly, temperature control is preferably carried out with the present invention utilizing x-ray diffraction techniques to periodically analyze the clinker for the proper content of X and Y and/or Z to verify the proper temperature. Those skilled in the art will appreciate that other forms of clinker analysis and resultant temperature control may be utilized, though x-ray diffraction is preferred.

The cement compositions produced in accordance with the methods of the present invention, following hydration, produce rapid hardening high early strength portland-type cements having compressive strengths on the order of 5000 psi within one hour, 8000 psi within twenty-four hours and 12,000 psi within twenty eight days. Thus, the cement compositions so produced are particularly well suited for use in concrete construction where low shrinkage, sulfate resistance, water impermeability or reduction in setting time will have economic advantage or other benefits. Moreover, the previously unattainable compressive strengths exhibited by the cement compositions of the present invention provide significant construction advantages, such as reduction in structure size and weight, without corresponding reductions in strength. Additionally, the heat of hydration of the compositions of the present invention prevents the hydrated cements from freezing in cold temperatures enabling construction to continue at temperatures below 0° C.

It is well known in the art that cement compositions can be mixed with inert materials to produce final products such as mortar and concrete. The cement compositions of the present invention can be mixed with different ratios of sand to produce mortars of any desired consistency. Similarly, the addition of aggregates such as gravel, together with sand, to the cement compounds of the present invention will result in concrete suitable for various industrial uses.

Further objects and advantages of the cement compositions produced in accordance with the teachings of the present invention as well as a better understanding thereof, will be afforded to those skilled in the art from a consideration of the following detailed explanation of preferred exemplary embodiments thereof.

DETAILED DESCRIPTION OF EXEMPLARY EMBODIMENTS

In spite of the long history of cement production and use incorporating $C_4A_3\bar{S}$, the prior art is devoid of processes which effectively produce X and Y and/or Z crystals all together in the cement kiln during the burning process. Typically, the well established procedure for producing portland type cement and variations thereof utilizes a rotary cement kiln heat treatment in excess of 1,500° C. to sinter or clinkerize the raw materials. These high temperatures are utilized because the desirable silicates, $C_3S$ and $C_2S$, start to form at temperatures around 1,300° C. and are stable above 1,500° C. In contrast to these silicates, crystals X, Y and Z, are not thermodynamically stable at temperatures above 1,300° C. and actually decompose at such elevated temperatures. As disclosed and claimed herein, crystals X, Y and Z begin to form at temperatures of approximately 900° C. and become stable at approximately 1,100° C. Therefore, due to the previously unrecognized differences in temperature stability between $C_3S/C_2S$ and crystals X, Y, and Z, cement and clinkers containing both $C_3S$ and $C_2S$ as well as X, Y and/or Z have not existed until now.

Accordingly, in contrast to the prior art cement producing methodologies, the methods and compositions of the present invention utilize special mixing formulas to design raw material mixes which in the cement kiln itself produce unique clinkers having high concentrations of crystals X, Y and/or Z. Further, regardless of the ability of the special clinkers so produced to become hydraulic cement upon grinding and hydration, when mixed with portland cement according to the teachings of the present invention, these unique clinkers produce rapid hardening high early. strength portland-type cements having compressive strengths following hydration ranging from 5,000 psi in one hour, 8,000 psi in twenty-four hours, and up to 12,000 psi in twenty-eight days. The cements of the present invention also exhibit exceptional sulfate resistance of 0.01% in one year, a water permeability of less than 1 mm at one year, a drying shrinkage of 0.03% in 28 days and a heat of hydration of 70 cal/g in 28 days.

Before proceeding further, for purposes of explanation and without wishing to be bound to the following proposed theory, it has been determined that the methods of the present invention produce unique cement compositions which, following hydration, incorporate crystals of Ettringite and calcium aluminates hydrate and calcium silicate hydrates. It is believed that the needle like crystals of Ettringite and calcium aluminates hydrate function to strengthen the hydraulic concretes so produced by forming networks of reinforcing micro-fibers. These internal three-dimensional reinforcing fiber matrices combine to produce the previously unattainable rapid hardening high early strength portland-type cement characteristics of the cement compositions of the present invention. In contrast, prior art cement compositions have been unable to produce a clinker with crystal X, Y and/or Z because of the excessive kiln temperatures required. The combination of crystals X, Y and/or Z produced in accordance with the teachings of the present invention, combined with hydraulic cement will produce cements that combine Ettringite from crystals of $(C,M,N,K)_6 A\bar{S}_3 .aq$, $C_6(A,F)\bar{S}_3 .aq$, and $C_6 (A,F)\bar{S}_3.aq$, and $C_3S. aq$ phases in a single cement. Those skilled in the art will appreciate that the foregoing proposed mechanisms for the properties of the cement compositions of the present invention are theoretical only and do not limit the scope or content of the present invention.

As noted above, the first step in the methods of the present invention is to produce or formulate special cement clinkers containing high amounts of crystals X, Y and/or Z in the kiln. The raw materials for these clinkers are those commonly known and used for the production of ordinary portland cement clinkers; namely, high alumina clay or bauxite or kaolinite, limestone, calcium fluoride and gypsum or phosphogypsum (industrial waste material from phosphate fertilizer processing). Those skilled in the art also will appreciate that these raw materials are sources of S, A, C, Mn, T, F, P, N, K, cl, f, and $\bar{S}$, which are, respectively $SiO_2$, $Al_2O_3$, CaO, $Mn_2O_3$, $TiO_2$, $Fe_2O_3$, $P_2O_5$, $Na_2O$, $K_2O$, Cl, F and $SO_3$. These raw materials are combined in accordance with the teachings of the present invention such that the mixtures so formed have an overall molar ratio of $\bar{S}/(A+F)$ between approximately 0.25 and 0.45, an overall molar ratio of S/A between approximately 0.05 and 1.5, an overall molar ratio of f/S between approximately 0.06 and 0.1, an overall molar ratio of N/C between approximately 0.05 and 0.1, an overall molar ratio of K/C between approximately 0.08 and 0.15, an overall molar ratio of M/C between approximately 0.03 and 0.05, and an overall molar ratio of P/A between approximately 0.03 and 0.05.

This raw material design has been optimized based upon the following theoretical understanding. First, it is known that small amounts of impurities will naturally occur in the raw materials utilized to form the raw material mixes. The impurities normally encountered include sodium oxide ($Na_2O$), potassium oxide ($K_2O$), magnesium oxide (MgO), titanium oxide ($TiO_2$), manganese oxide ($Mn_2O_3$), phosphate ($P_2O_5$), and the like. However, because of the unique compositions of the raw materials mixes of the present invention and because of the associated methods, these impurities will be incorporated into desirable crystals in the kiln.

Additionally, in accordance with the teachings of the present invention, S is going to react with C, A, F, f and $\bar{S}$ to form crystals X, Y and/or Z. Any iron present in the raw materials will most likely substitute for the alumina in X, but will not form $C_4AF$ or $C_2F$ as long as the ratio of A/F is greater than 0.64. Any silica present in the raw materials will react with the remaining C to form crystals Y or Z at the clinkerization temperatures utilized herein. However, this formation is concurrent with the formation of crystals X. Moreover, crystals X will be in equilibrium with crystals Y or Z as long as the ratio of $\bar{S}/A+F$ is between approximately 0.05 and 1.5. If the ratio of f/S is approximately less than 0.06, the crystal Z phase will be formed. Conversely, if the ratio exceeds approximately 0.1, crystal Y phase will form. If the ratio is between 0.06 and 0.1, crystal Y and Z will form in equilibrium with crystal X.

Similarly, impurities such as sodium oxide (N) and potassium oxide (K) will be incorporated in crystal X with the sulfate present in the raw mix composition and the remaining sulfate will react to from crystals Y and/or Z. Any uncombined $\bar{S}$ will react with C to form crystals Y, Z and/or $C\bar{S}$ and the remaining C will react to from crystals Y and/or Z.

Those skilled in the art will also appreciate that the design of the raw material mix of the present invention can be performed using traditional chemical analysis techniques of the raw materials utilized. For example, assuming an exemplary raw material mix is formed from Bauxite, limestone gypsum, and calcium fluoride containing S, A, C, Mn, T, F, P, N, K, Cl, f, and $\bar{S}$. the following potential compound formulas can be utilized in accordance with the teachings of the present invention to design the exemplary raw material mix.

The amount of Y=26.5 f

The amount of X=1.995 A+1.63 F +1.64 Mn+0.95 S+2.27 T+1.71 P

The amount of sulfate in X=0.26 A+0.17 (F+Mn)+0.15 S+0.33 T+0.19 P

The amount of sulfate in Y=8.7 f

The amount of silicate in Y=6.3 f

The amount of calcium in $C_4A_3\bar{S}$=0.73 A+0.47(F+Mn)

The amount of $C\bar{S}$=1.7 [$\bar{S}$−(0.65 N+0.425 K+0.26 A+0.17 (F+Mn))]

The amount of C in $C\bar{S}$=0.41 CS

The amount of C in $C_2S$=1.87 S

The total required amount of C=0.55 A+0.35(F+Mn)+ 1.87 S+0.7 $\bar{S}$−0.45 N−0.30 K The total required amount of $\bar{S}$=0.65 N+0.425 K+0.26 A+0.17(F+Mn)

As noted above, the temperature range where crystals X, Y and Z are stable varies between approximately 900° C. and 1,200° C. Accordingly, the mixture of raw materials produced in accordance with the methods of the present invention are heated to an elevated temperature between these relatively narrow limits for a sufficient period of time to form the special clinker having a high concentration of crystals X, and Y and/or Z. This time period will vary depending upon the composition of the mixture of the present invention and as known in the art, the kiln and associated cooler geometry. The resulting concentration of crystal X will range between approximately 15% and 75%, of crystal Y between 5% and 50%, and of crystal Z between 5% and 75% by weight.

It should be noted that, unlike conventional oven technology with its refined temperature control, the present state of the cement kiln temperature control art does not involve traditionally understood temperature controls at the burning zone. Typically, the control of the clinker temperature in the kiln is carried out by wet chemical analysis for free C (free lime). For example, the design formulas for traditional portland cement raw materials permit the presence of predetermined amounts of free C in the clinker. If wet chemical analysis of the clinker determines that the amount of free C is higher than the design amount, the clinker is being under burned and the kiln temperature must be raised.

However, such wet chemical methods may not be practically applicable to the production of clinker having high weight percentages of crystals X, Y and/or Z as taught by the present invention. Wet chemical analysis may be deceiving in this context because the alumina, clay, bauxite and the like, contain $\bar{S}$ and S. The sulfur and silica will react with calcium and alumina in crystals X, Y and/or Z. As a result, wet chemical analysis methods may not indicate which crystal phase is currently present in the clinker.

Accordingly, a preferred technique for controlling the elevated temperatures of the heat treatment of the present invention utilizes periodic x-ray diffraction analysis of samples taken from the heated mixture rather than wet chemistry analysis. As with the prior art wet chemical methods of analysis, the previously described formulas of the present invention allow the identification and determination of a design amount of crystals X, Y and/or Z in accordance with the teachings of the present invention. By preparing a pre-calibrated x-ray diffraction curve, as known in the art, but here based upon laboratory reference standards for quantitatively analyzing the amount of crystals X, Y, and/or Z, or analyzing the designed mixture having different percentages of crystals X, Y, and/or Z present in known reference samples, it becomes possible to periodically remove samples of the heated mixture from the kiln and to quantitatively analyze these samples for the desired design content of crystals X, Y, and/or Z. Then, as with traditional wet chemistry methods for kiln control, the temperature of the heated mixture can be adjusted either up or down to produce the desired combination of crystals X, Y and/or Z as designed in the raw material mixes of the present invention.

It again should be emphasized that the elevated temperature ranges utilized to produce the clinker containing the desired combinations of crystals X, Y and/or Z in accordance with the teachings of the present invention are relatively narrow when compared to traditional cement clinkerization temperatures. Accordingly, careful temperature control through x-ray diffraction analysis or some other method of fire temperature control should be practiced in order to produce the stable combinations of crystals X, Y and/or Z phases in the clinker as disclosed and claimed herein.

Those skilled in the art will also appreciate that an exemplary x-ray diffraction precalibrated curve can be prepared by conducting a number of laboratory trial design bums of the desired raw material mixes. The trials should include underburning, overburning and burning at the correct or desired temperatures. The amount of the designed combination of crystals X, Y and/or Z in each trial burn can then be quantitatively analyzed through x-ray diffraction and compared to ASTM standard curves for quantitatively calculating the contents of $C_3S$ and $C_2S$, $C_3A$ and X, Y and/or Z. During production of the clinker in accordance with the present invention, a sample of the heat treated raw material will preferably be taken from the kiln approximately each one-half hour or each hour to be analyzed quantitatively by x-ray diffraction. To facilitate this analysis an x-ray diffraction machine can be computer calibrated to the preburning trials.

Once the clinker has been properly burned or clinkerized, the next step in the production of the cement compositions of the present invention involves determining the average amount of the combination of crystals X, Y and/or Z present in the clinker. Typically, the clinker so produced will not have cementuous values itself upon grinding. Accordingly, the next step of the cement forming aspect of the present invention involves forming a final mixture of the clinker with C containing portland-type cement. The compositions of the final mixtures include an X crystals content of approximately 10% to 30% by weight, a Y crystals content of approximately 5% to 50% by weight, and a Z crystals content of approximately 10% to 60% by weight. Mixing the special clinker of the present invention with hydraulic or portland type cement is a preferred technique because it incorporates $C_3S$ into the cement by providing free lime and $C_3S$ to the mixture.

In contrast to the prior art methods of cement production utilizing known stoichiometric reactions of crystals X to produce expansive crystals (or adding $C\bar{S}$ anhydrite or gypsum to the clinker) the final cement compositions of the present invention will have $C\bar{S}$ from the hydration process of crystals Y and/or Z. The methods of the present invention form final mixtures of the clinkers, which contain combination of crystals X, Y and/or Z, with portland cement or hydraulic cement containing $C_3S$ and $C_2S$. The hydration reactions of these novel cement compositions involves not only the hydration of the normal portland cement component such as $C_3S$ and $C_2S$ crystal, but also the reaction of the disassociated highly reactivate $C_2S$ component from crystals Y or Z. This disassociation can be enhanced by the addition of active alkali ions such as, without limitation, sodium, potassium, lithium, or preferably, their salts, such as carbonate, sulfate, borate, citrate, hydrate and the like. Moreover, these salts can be used as accelerators for the cement compositions and concretes thereafter. Also this disassociation can be enhanced by the addition of organic acids such as, but not limited to, citric acid, sulphonic acid, glycolic acid, tartaric acid, malic acid, and the like. If desired, these acids can be used as a retarders for the cement and concretes thereafter.

Those skilled in the art will also appreciate that the design mixes of the cement compositions of the present invention can be modified to produce a wide variety of desirable very early strength characteristics. Additionally, various additives can be incorporated into the cement compositions to provide additional desirable properties. Similarly, the setting time of the cement compositions of the present invention can be furthered controlled through the adjustment of the mixing proportions of the three main raw material components as well as by modifying the fineness of the cements produced in the grinding mill.

For example, in cold or severe weather conditions, the setting time may increase from fifteen minutes to approximately two hours. Thus a suitable accelerator, such as aluminum sulfate or iron sulfate may be incorporated into the cement to increase the rate of cure. In addition to those accelerators previously noted, any chloride accelerator used for portland cement can also be used with the cement compositions of the present inventions. Additionally, a citric acid, tartaric acid, malic acid, or carbonic acid, retarder may be added to the cement compositions of the present invention to increase the initial set up time to something on the order of two hours. However, it should be appreciated that an initial set time of fifteen minutes following hydration is an ideal time for mixing the cement with a super plasticizer to reduce the quantity of mixing water or the resultant concrete slump.

It should also be appreciated that concrete compositions from the new cements produced in accordance with the teaching of the present invention have very low water-permeability, increased sulfate resistance, and improved non-shrinking characteristics. Moreover, these cement compositions are also sea water resistant. For increased resistance to freeze and thaw, however, the addition of super-plasticizer, air entraining agents or silica fume to these compositions is recommended. A further understanding of the exemplary cement compositions of the present invention and the associated methods and clinkers will be afforded to those skilled in the art from the following non-limiting examples:

EXAMPLE I

In accordance with the methods of the present invention an exemplary mixture of limestone, gypsum and Bauxite was produced to form a raw mixture for a clinker containing X and Y crystals. The components of the mixture were combined in the form of dry powders. The chemical analysis of the raw materials was as follows:

|     | Bauxite | Limestone | Gypsum |
| --- | --- | --- | --- |
| $SiO_2$ | 3.77% | 0.97% | 1.55% |
| $Al_2O_3$ | 74.93% | 0.42% | 0.50% |
| CaO | 0.23% | 53.00% | 31.85% |
| $Fe_2O_3$ | 1.23% | 0.18% | 0.20% |
| MgO | 0.12% | 1.60% | 3.60% |
| $K_2O$ | 0.14% | 0.15% | 0.05% |
| $SO_3$ | 0.50% | 0.10% | 40.45% |
| $TiO_2$ | 3.78% | 0.02 | 000 |
| L.O.I. | 14.78% | 43.00% | 22.75% |

Utilizing the raw material mixing formulas of the present invention it was determined that a clinker containing an average of approximately 75% crystal X and 25% crystal Z could be produced from these raw materials by mixing 40% by weight of the limestone with 26% by weight of the gypsum and 34% by weight of the bauxite. This raw material mixture was fired at a temperature between 1,000° C. and 1,200° C., to produce a high $C_4A_3\bar{S}$ clinker. The clinker so produced did not have any significant cementuous values.

The emission gases during the burn were reduced significantly compared to those of normal portland cement clinker. For instance the emission of $SO_3$ during the burning of the clinker of Example I ranged from 13 ppm to 82 ppm, compared to the 500 ppm limit for normal portland cement clinker. Those skilled in the art also will appreciate that the lower burning temperatures of the present invention will reduce NOx emissions by nearly 30%. Further, the lower content of limestone in the clinkers of the present invention as compared to those of portland cement will lower the emission of COx by nearly 50%.

Again, using the mixing procedures of the present invention, this exemplary clinker was further mixed with portland cement in the following proportions: 40% high crystal X and Z clinker, 60% portland cement type II. The resultant exemplary cement mixture contained approximately 25% crystal X, approximately 10% crystal Z and approximately 65% silicate ($C_3S$ and $C_2S$). A test of this exemplary cement mortar designed to demonstrate compressive strength as a function of age produced the following results:

| Age | Compressive Strength |
| --- | --- |
| 1.5 hours | 6,000 psi |
| 3 hours | 7,000 psi |
| 1 day | 10,000 psi |
| 7 days | 10,500 psi |
| 28 days | 12,000 psi |

EXAMPLE II

As with Example I, an initial mixture of raw materials, this time comprising bauxite, limestone and phosphogypsum (industrial waste material from phosphate fertilizer processing), was produced in accordance with the present invention to form a raw material mixture for use in producing a combination of X, Y, and Z crystal clinker. The chemical analysis of the raw materials was as follows:

|     | Bauxite | Limestone | Phosphogypsum |
| --- | --- | --- | --- |
| $SiO_2$ | 9.50% | 11.00% | 5.00% |
| $Al_2O_3$ | 48.00% | 1.50% | 0.20% |
| CaO | 4.30% | 47.60% | 29.60% |
| $Fe_2O_3$ | 27.00% | 0.30% | 0.13% |
| MgO | 0.23% | 0.30% | 0.19% |
| $K_2O$ | 0.74% | 0.15% | 0.05% |
| $SO_3$ | 0.00% | 0.10% | 41.00% |
| L.O.I. | 13.00% | 40.00% | 22.00% |
| $TiO_2$ | 3.50% | 0.00% | 0.00% |
| $P_2O_5$ | 000 | 000 | 0.32% |
| F | 000 | 000 | 0.165% |

Utilizing the mixing formulas and techniques of the present invention, it was determined that after firing these raw materials, a clinker could be produced containing 65% crystal X, 25% crystal Y, and 10% crystal Z by combining 28% by weight bauxite with 25% by weight limestone and 47% by weight phosphogypsum. Again, utilizing the teachings of the present invention, the fired clinker was combined with portland type I-II cement in the proportions of 50% high combination of X, Y and Z crystal clinker, 50% portland type I-II cement, to produce a final cement composition containing 25% crystal X, 7% crystal Y and 5% crystal Z, and 55% ($C_2S+C_3S+C_3A+C_4AF$) from Portland cement When hydrated, the exemplary cement composition of Example II, exhibited a low heat of hydration of 58 Kcal/kg in 3 days and 70 cal/g in 28 days. It also exhibited sulfate resistance of 0.01%, a water permeability of less than 1 mm, a drying shrinkage of 0.03%, a heat of hydration of 70 cal/g.

Those skilled in the art will appreciate that this exemplary heat of hydration is comparable to the low heat of hydration type of portland cement. Also, those skilled in the art will appreciate that this exemplary heat of hydration evolved during the initial plastic stage of the hydrated cement and made this exemplary cement composition particularly well suited for applications in cold weather and sub-zero temperatures as well as reducing the potential for heat induced cracking.

The range of X, Y and/or Z crystal combinations that may be produced in accordance with the teachings of the present invention in the initial fired clinker can vary widely. However, an X crystal content of less than approximately 10%, though being within the scope of the present invention, most likely would not be economically desirable. Conversely, depending upon the chemical compositions of the raw materials involved in producing the original mixtures for the clinkers, an X content as high as approximately 75% is contemplated as being within the scope of the present invention. The same is true for crystal Y and/or crystal Z, where content of less than approximately 5% is within the scope of the present invention, but most likely would not be economically desirable. Conversely, depending upon the chemical composition of the raw materials involved in producing the original mixtures for the clinkers, a crystal Y and/or crystal Z content as high as approximately 75% is within the scope of the present invention.

Similarly, mixing ratios for the fired clinkers and portland cement clinker can also vary widely depending upon the desired percentage of X, Y and/or Z crystals in the final cement compositions. However, it is anticipated that the most economical cement compositions produced in accordance with the present invention will contain a weight percentage of crystal X ranging from approximately 10% to 30%. Accordingly, the associated content of crystal Y and/or crystal Z will most economically vary from approximately 5% to 55%. The remainder of the compositions can be formed of any type of hydraulic cement. However, it is preferred that the added hydraulic cements have a high content of the $C_3S$ phase. Thus, the remainder of the cement compositions will preferably comprise portland type cement varying from approximately 45% to 85% by weight of $C_2S$ and $C_3S$, depending upon the desired strength and other properties of the intended final hydraulic cement products.

Clinkers made in accordance with the teachings of the present invention are analyzed using methods known to those skilled in the art of quantitative analytical inorganic chemistry including, but not limited to x-ray technology. Using the aforementioned analytical methods the clinkers of the present invention were found to contain between 3 wt. % to 14 wt. % $SiO_2$, between approximately 10 wt. % to 45.4 wt. % $Al_2O_3$, between approximately 1 wt. % to 9 wt. % $Fe_2O_3$, between approximately 38 wt. % to 57 wt. % CaO, between approximately 0.2 wt. % to 2.0 wt. % MgO and between approximately 5 wt. % to 25 wt. % $SO_3$ and between approximately 0.01 wt. % and approximately 3.25 wt. % Fluorine.

It is understood that in cases where the exact concentration of the aforementioned chemical compounds do not total 100% that the remainder may be composed of one or more chemical species described elsewhere in this specification, or different chemical species incidentally found in the raw material mix used to prepare the clinkers of the present invention. Moreover, it is understood that the presence of such chemical species other than those listed in Table III below are not necessary or required to form the clinkers of the present invention.

The abbreviations $SiO_2$, $Al_2O_3$, $Fe_2O_3$, CaO, MgO and $SO_3$ are to be given their ordinary meaning as known to those skilled in the chemical arts and as described on a standard Periodic Table of the Elements. The term "approximately between" is not intended to add uncertainty or ambiguity to subject matter of the present invention and is merely used to denote that the wt. percentages stated are not absolutely exact and that minor fluctuations in the ranges consistent with the limits inherent in quantitative analytical methods are within the scope of the invention.

The term "wt. percent" is "weight percent" as defined in standard chemical texts to means wt. of solute/wt. of solution×100, or used herein the weight of the inorganic chemical compound/the weight of the clinker material×100.

the present invention is not limited to the particular exemplary compositions which have been illustrated and described in detail herein.

What is claimed is:

1. A cement comprising a clinkered material, the clinkered material comprising a crystal having the solid solution formula $\{(C,K,N,M)_4(A,F,Mn,P,T,S)_3(cl,\overline{S})\}$ and a crystal having the solid solution formula $\{(C_2S)_3(C\overline{S})_3Ca(f,cl)_2\}$.

2. The cement of claim 1, further comprising CaO.

3. The cement of claim 1 having a compressive strength greater than 3,000 psi within approximately one hour following hydration.

4. The cement of claim 1, further comprising citric acid.

5. The cement of claim 1, further comprising a lithium salt.

6. A concrete comprising the cement according to claim 1.

7. A cement having a compressive strength greater than 3,000 psi within approximately one hour following hydration and comprising a crystal having the solid solution formula $\{(C_2S)_3(C\overline{S})_3Ca(f,cl)_2\}$.

8. The cement of claim 7, further comprising CaO.

9. The cement of claim 7, further comprising citric acid.

10. The cement of claim 7, further comprising a lithium salt.

11. A concrete comprising the cement according to claim 7.

12. A method for producing a clinkered material, comprising:
    mixing raw materials containing at least materials represented in solid solution notation as C, A, $\overline{S}$, and f; and
    heating the mixture of raw materials to an elevated temperature on the order of 900° C. to 1200° C. for a sufficient period of time to form a clinkered material comprising from 10% to 75% by weight of a crystal having the solid solution formula $\{(C,K,N,M)_4(A,F,Mn,P,T,S)_3(cl,\overline{S})\}$, and from 5% to 75% by weight of a crystal having the solid solution formula $\{(C_2S)_3(C\overline{S})_3Ca(f,cl)_2\}$.

TABLE III

| Clinker number | Date analyzed | Weight Percent | | | | | | |
|---|---|---|---|---|---|---|---|---|
| | | $SiO_2$ | $Al_2O_3$ | $Fe_2O_3$ | CaO | MgO | $SO_3$ | F |
| 1 | December 1995 | 10–11 | 14–15 | 8–9 | 48–50 | 1.5 | 22–23 | 1.2–2.25 |
| 2 | December 1997 | 11–12 | 21–22 | 1–2 | 40–42 | 1.3 | 21–23 | 1–1.17 |
| 3 | December 1999 | 5–6 | 33–34 | 2–3 | 38–40 | 0.5 | 19–20 | 0.01–0.5 |
| 4 | March 1999 | 4–6 | 23–25 | 2–3 | 48–53 | 1–2 | 23–25 | 0.6–1 |
| 5 | June 1999 | 5–7 | 40–45 | 4–5 | 48–53 | 0.2–.05 | 5–8 | 0.5–0.7 |
| 6 | May 2000 | 2–14 | 10–15 | 3–4 | 55–57 | 0.5–1 | 8–10 | 1.2–1.8 |
| 7 | June 2000 | 3.5 | 38–43 | 2–3 | 38–41 | 1–2 | 11–14 | 0.5–1 |

In the foregoing description of the present invention, preferred exemplary embodiments of the invention have been disclosed. It is to be understood by those skilled in the art that other equivalent cement and clinker compositions are within the scope of the present invention. Accordingly, 13. The method claimed in claim 12, further comprising mixing the clinkered material with a CaO containing cement.

* * * * *